(12) United States Patent
Baumann et al.

(10) Patent No.: US 6,555,088 B1
(45) Date of Patent: Apr. 29, 2003

(54) METHOD FOR CATALYTIC CONVERSION OF CARBON MONOXIDE IN A HYDROGEN-CONTAINING GAS MIXTURE WITH IMPROVED COLD START BEHAVIOR

(75) Inventors: Frank Baumann, Alzenau (DE); Stefan Wieland, Offenbach (DE)

(73) Assignee: DMC2 Degussa Metal Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/566,981

(22) Filed: May 9, 2000

(30) Foreign Application Priority Data

Mar. 21, 2000 (DE) .......................................... 100 13 894

(51) Int. Cl.⁷ ............................. C01B 3/16; C01B 31/20
(52) U.S. Cl. .................................... 423/656; 423/437.2
(58) Field of Search ............................. 423/437.2, 656; 502/304, 326, 327, 331, 333, 334, 336, 339, 345, 346

(56) References Cited

U.S. PATENT DOCUMENTS

| | | | |
|---|---|---|---|
| 4,283,308 A | 8/1981 | Ohara et al. ................. | 252/435 |
| 4,492,769 A | * 1/1985 | Blanchard et al. .......... | 502/262 |
| 4,708,946 A | 11/1987 | Ohata et al. ................. | 502/304 |
| 5,478,528 A | * 12/1995 | Golunski et al. ............. | 422/88 |

FOREIGN PATENT DOCUMENTS

| | | | | |
|---|---|---|---|---|
| DE | OS 1 642 909 | 5/1971 | ............ | C01B/31/20 |
| DE | 24 53 784 A1 | 5/1975 | ............ | C01B/2/10 |
| DE | 689 04 778 T2 | 4/1990 | ............ | B01J/37/02 |
| DE | 689 05 891 T2 | 4/1990 | ............ | C01B/3/48 |
| DE | 40 03 939 C2 | 8/1991 | ............ | B01J/23/56 |
| DE | 693 26 820 T2 | 6/1994 | ............ | B01J/23/44 |
| DE | 43 03 715 A1 | 8/1994 | ............ | B01J/23/88 |
| DE | 197 27 588 C1 | 2/1999 | ............ | C01B/3/02 |
| DE | 197 55 814 C1 | 11/1999 | ............ | C01B/3/34 |
| EP | 1 058 328 | 6/2000 | | |
| EP | 1 161 991 | 12/2001 | | |
| FR | 2 567 866 | 7/1984 | ............ | C01B/3/16 |
| WO | WO 98/08771 | 3/1998 | | |
| WO | WO 99/35082 | 7/1999 | | |
| WO | WO 99/36351 | 7/1999 | ............ | C01B/3/38 |
| WO | WO 00/66486 | 9/2000 | | |

OTHER PUBLICATIONS

German Office Action dated Dec. 5, 2000, corresponding to the German (priority) patent application No. 100 13 894.2. Translation of above–referenced German Office Action with attached verification of translation.

Whittington, B.J. et al., "The Relative Importance of Catalytic Oxidation, Steam Reforming and Water–gas Shift Reactions," Catalysis Today, Bd. 26, 1995, Seiten 41–45, XP002198479.

Ertl et al., "Handbook of Heterogeneous Catalysis," vol. 4, 1997, VCH Verlagsgesellaschaft, Weinheim, Germany, XP002200710.

Grenoble, D.C. et al, "The Chemistry of the Water Gas Shift Reaction: 1. Kinetics Over Supported Metal Catalysts," Bd. 67, Nr. 1, 1981, Seiten 90–102, XP001071022.

Boccizzi, F. et al., "FTIR Study of the Low–Temperature Water–Gas Shift Reaction on Au/Fe2O3 and Au/TiO2 Catalysts," Journal of Catalysis, Bd. 188, Seiten 176–185, XP002199864.

\* cited by examiner

*Primary Examiner*—Wayne A. Langel
*Assistant Examiner*—Maribel Medina
(74) *Attorney, Agent, or Firm*—Kalow & Springut LLP

(57) ABSTRACT

A method for conversion of carbon monoxide to carbon dioxide and hydrogen with water in a gas mixture containing hydrogen and other oxidizable components. An oxidation-active noble metal shift catalyst is the catalyst. The necessary operating temperature of the catalyst is established and optionally maintained by partial oxidation of the oxidizable components of the gas mixture.

16 Claims, No Drawings

METHOD FOR CATALYTIC CONVERSION OF CARBON MONOXIDE IN A HYDROGEN-CONTAINING GAS MIXTURE WITH IMPROVED COLD START BEHAVIOR

INTRODUCTION AND BACKGROUND

The present invention relates to a method of catalytic conversion of carbon monoxide with water to carbon dioxide and hydrogen in a gas mixture that contains hydrogen and other oxidizable components. In a further aspect, the present invention also relates to a catalyst suitable for the catalytic conversion.

The conversion of carbon monoxide with water to carbon dioxide and hydrogen in the presence of catalysts is a known method of producing hydrogen-rich gas mixtures, which is based on the following exothermic reaction:

$$CO + H_2O \rightleftharpoons H_2O + CO_2 \quad \Delta H > 0 \tag{1}$$

In the above system the following side reactions can occur:

$$CO \text{ methanation: } CO + 3H_2 \rightleftharpoons CH_4 + H_2O \quad \Delta H > 0 \tag{2}$$

and $$CO_2 \text{ methanation: } CO_2 + 4H_2 \rightleftharpoons CH_4 + H_2O \quad \Delta H > 0 \tag{3}$$

The reaction in accordance with reaction equation (1) is called carbon monoxide conversion or CO conversion herein. The term "water gas shift reaction" is commonly used for this.

To production of hydrogen-rich gas mixtures from hydrocarbons or alcohols by steam reforming, partial oxidation or autothermal reforming is a known process. These gas mixtures (reformates) contain 1 to 40 vol % carbon monoxide, depending on the method that is used.

To use the reformate as fuel in fuel cells, it is necessary to reduce the carbon monoxide contained in them as far as possible, in order to avoid poisoning of the platinum-containing anode catalyst of the fuel cell in the oxidation of the hydrogen. In addition, the conversion of carbon monoxide in accordance with reaction equation (1) leads to an increase of the hydrogen content of the reformate and thus to an improvement of the efficiency of the overall process.

For reasons of size and weight, catalysts for conversion of carbon monoxide with very high activity and selectivity are required for use in motor vehicles. The high space-time yields that can be achieved by this allow the volume of the reactors that are required to be kept small.

The known catalysts for the conversion of carbon monoxide have chiefly been developed for stationary industrial applications. The emphasis lay in the production of pure hydrogen, ammonia and other large scale products that are based on the use of synthesis gas mixtures ($CO/H_2$). Catalysts for the conversion of carbon monoxide in accordance with reaction equation (1) are also called shift catalysts herein.

These known catalysts are full body catalysts that contain non-noble metals. They are used in two stage processes. In the first process stage, a so called high-temperature CO conversion (high-temperature water gas shift, HTS) is carried out on Fe/Cr catalysts at temperatures between 360 and 450° C. In the subsequent second stage, a low-temperature CO conversion (low-temperature water gas shift, LTS) is undertaken on Cu/ZnO catalysts at temperatures between 200 and 270° C. After the low temperature process stage, carbon monoxide concentrations of less than 1 vol % in correspondence with the thermal equilibrium are obtained.

The conventional catalysts for the conversion of carbon monoxide have crucial disadvantages:

The described two-stage conduct of the process is necessary because of the properties of these catalysts. While Cu/ZnO-containing catalysts become deactivated about 270° C. because of recrystallization, or sintering, of the copper, the Fe/Cr-containing catalysts that are used in the high temperature range cannot be used at low temperatures because of insufficient activity. If the indicated temperature range of the high temperature catalysts is exceeded, methanation reactions (reaction equations (2) and (3)) can occur, which reduce the selectivity of the high temperature catalysts and, because of this, lower the overall efficiency of the hydrogen generation system.

Both the known high-temperature and the low-temperature catalysts are bulk catalysts in which the catalyst material is pressed to form pellets or other molded bodies. Accordingly, they consist entirely of catalytically active mass and are also called complete catalysts. As a rule, they have a very high bulk weight.

The known industrial methods for conversion of carbon monoxide on catalysts according to reaction equation (1) operate at space velocities of the gas mixture between 300 and 3000 h$^{-1}$. These low velocities are not sufficient for use in motor vehicles.

High bulk weights and low space velocities lead to low specific conversion rates $R_{CO}$ for the carbon monoxide, which is understood within the scope of this invention to mean the amount of carbon monoxide $N_{CO}$ converted per weight of the catalyst $m_{cat}$ and reaction time $\Delta t$. The weight of the catalyst here is given in grams, the reaction time in seconds and the amount of carbon monoxide in moles:

$$R_{CO} = \frac{n_{cO}}{m_{Cat}\Delta t} \left[\frac{\text{mol}}{\text{g} \cdot \text{s}}\right] \tag{4}$$

The known Cu/ZnO and Fe/Cr catalysts have to be activated by reduction before they are used. The activated catalysts are sensitive to oxygen. Upon contact with atmospheric oxygen, they are reoxidized and deactivated in an exothermic reaction.

In comparison with the just described industrial high temperature and low temperature catalysts based on Fe/Cr or Cu/ZnO, noble metal catalysts for these uses are also known, mainly from the scientific literature.

In "The Chemistry and Catalysis of the Water Gas Shift Reaction. 1. The Kinetics over Supported Metal Catalysts," J. Catal. 67 (1980) 90–102, D. C. Grenoble et al. describe powdered catalysts that contain Cu, Re, Co, Ru, Ni, Pt, Os, Au, Fe, Pd, Rh or Ir as active components and that are deposited on aluminum oxide ($Al_2O_3$) as a support material. The kinetic tests gave a reaction order of about 0.2 for carbon monoxide and about 0.5 for the water that was used.

In "Methanization and Water Gas Shift Reactions over Pt/CeO$_2$," J. Catal. 96 (1985), 285–287, Steinberg et al. observed poor selectivities in view of the carbon monoxide conversion according to reaction (1). Accordingly, the product gas mixture contains high proportions of methane.

In "Water gas shift conversion using a feed with a low steam to carbon monoxide ratio and containing sulfur," Catal. Today 30 (1996) 107–118, J. Ross et al. investigate a Pt/ZrO$_2$ catalyst, in addition to Fe/Cr, Cu/ZnO and Co/Cr catalysts. This catalyst shows a carbon monoxide conversion of 50% at 320° C. The Pt/ZrO$_2$ catalyst shows the highest tolerance for sulfur-containing compounds among the tested compounds. It shows a conversion of 25% at 300° C. and a conversion of 70% at 350° C. This corresponds to a specific carbon monoxide conversion rate $R_{CO}$ (300° C.)=7.00 ×10$^{-6}$ mol/g$_{cat}$·sec), or $R_{CO}$ (350° C.)=1.95×10$^{-5}$ mol/g$_{cat}$·sec).

FR 2567866 A describes a copper- and/or palladium-containing catalyst on a carrier of $ZnAl_2O_4$ spinel, which is obtained by impregnating the spinel formed into particles with diameters between 0.4 and 0.6 mm with solutions of copper and/or palladium and calcining it. A conversion of 86% is achieved with this catalyst at pressures of 40 bar and a temperature of 250° C. at a very high excess of water ($H_2O/CO$=10).

The powdered catalyst systems that have been investigated in the scientific literature are not suitable for industrial use.

The known complete catalysts in the form of tablets, pellets or irregularly shaped particles are used as so-called bulk catalysts. In addition, the achievable specific conversion rates with these catalysts are low.

It is thus an object of this invention to devise a method for conversion of carbon monoxide in a hydrogen-containing gas that enables, under the conditions of mobile use in motor vehicles with their rapidly changing performance requirements, a high specific conversion rate for carbon monoxide with good selectivity, a high temperature stability and an insensitivity to oxygen in the educt gas mixture.

In particular, another object of the present invention is to achieve operational readiness as fast as possible after a cold start.

Another object of the invention is to develop a catalyst that is suitable for the method.

SUMMARY OF THE INVENTION

The above and other objects of the invention can be achieved by a method for catalytic conversion of carbon monoxide with water to carbon dioxide and hydrogen in a gas mixture containing hydrogen (carbon monoxide conversion), where the gas mixture can contain additional oxidizable components. For conversion of the carbon monoxide, the gas mixture is passed over a shift catalyst that is at an operating temperature for carbon monoxide conversion. The method is characterized by the fact that the shift catalyst is an oxidation-active shift catalyst based on noble metals and the necessary operating temperature of the catalyst is established and optionally maintained by partial oxidation of the oxidizable components of the gas mixture.

The method of the invention is specifically conceived for mobile use in motor vehicles that operate with fuel cells in order to effectively remove carbon monoxide from the hydrogen-rich gas mixture that is obtained by steam reforming, partial oxidation or autothermal reforming (hereinafter also called reformate gas) in all operating conditions of the motor vehicle. The gas mixture can, depending on its production, contain up to 40 vol % carbon monoxide.

The mobile use of the method imposes high demands on its dynamics. For instance, it is expected that only a few seconds after a cold start, the fuel cell of the vehicle can be supplied with hydrogen. This means that the catalyst used for the proposed method must be heated to its operating temperature in a few seconds. During operation of the motor vehicle, the catalysts are loaded with very differing space velocities. They vary between a low space velocity at idling of the motor vehicle and 100,000 h$^{-1}$ at full load. In the lower load range, it may occur that the heat production of the carbon monoxide conversion in accordance with equation (1) will not be sufficient to keep the catalyst at operating temperature.

The method according to the present invention solves this problem by catalytic combustion of a variable proportion of the oxidizable components of the gas mixture in order to bring the catalyst to its operating temperature for carbon monoxide conversion rapidly after a cold start, or to keep it at this temperature during operation. For this reason, it is important for the method that the catalysts that are used be capable of oxidizing the oxidizable components of the gas mixture without becoming deactivated themselves. Here, it is important that the light off temperature of the catalyst be lower for the oxidation reaction than its operating temperature is for carbon monoxide conversion.

These requirements are satisfied, for example, by catalysts that contain components of the platinum group metals, thus platinum, palladium, rhodium, iridium, ruthenium and osmium, or gold as active components on an oxide support material selected from the group aluminum oxide, silicon dioxide, titanium oxide, rare earth oxides or mixed oxides thereof or zeolites. A catalyst with this function is called an oxidation-active catalyst herein. In order to enable the finest possible distribution of the catalytically active components on the support material, the support material should have a specific surface (BET surface, measured in accordance with DIN 66132) of more than 10 m$^2$/g. Such oxidation-active noble metal catalysts have kickoff temperatures for the oxidation of carbon monoxide in the range between 120 and 170° C.

DETAILED DESCRIPTIONS OF THE INVENTION

The present invention will now be described in further detail.

Oxidation-active noble metal catalysts have a certain shift activity, i.e., they are capable of converting carbon monoxide to carbon dioxide and water in accordance with reaction equation (1) with water if the appropriate reaction conditions exist (temperature, gas composition). Their shift activity and selectivity can be improved by the addition of other catalytically active components, or promoters. Among these are elements of the rare earth metals, especially cerium and lanthanum, as well as the non-noble metals of the subgroups of the periodic system of elements, especially iron or copper. These additives do not adversely affect the oxidation activity of the catalyst.

Moreover, the shift activity and selectivity can also be increased by doping the support material with redox-active oxides of the metals cerium, zirconium, titanium, vanadium, manganese and iron in an amount of 1 to 50 wt % with respect to the total weight of the support material.

A preferred noble metal shift catalyst for the method in accordance with the invention contains platinum and/or palladium together with iron or copper as well as cerium oxide on finely divided aluminum oxide.

The oxygen necessary for oxidation can be contained in the gas mixture itself or can be added to the gas mixture before contact with the catalyst. In the latter case, the oxygen is added to the gas mixture depending on the prevailing process parameters. Among the relevant process parameters are the space velocity, pressure, carbon monoxide concentration and initial temperature of the gas mixture.

The method operates at gas mixture space velocities from an idling space velocity up to a value of 100,000 h$^{-1}$, and at a pressure between atmospheric pressure and 10 bar. It can be used both for low-temperature CO conversation and high-temperature CO conversion.

An oxidation-active noble metal shift catalyst with an operating temperature between 180 and 300° C. is used for the low-temperature CO conversion. The low operating temperature is achieved through a relatively high charge of the catalyst with the catalytically active noble metals. In the low-temperature CO conversion, the reformate gas usually contains 2 to 15 vol % carbon monoxide and has an initial temperature of between 100 and 250° C., which derives from the reforming process.

An oxidation-active noble metal shift catalyst with an operating temperature between 280 and 550° C. is used for the high-temperature CO conversion. In the high temperature CO conversion, the reformate gas usually contains 2 to 40 vol % carbon monoxide and has an initial temperature of between 300 and 600° C., which derives from the reforming process.

The process enables a high-temperature conversion stage and a low-temperature conversion stage to be connected successively. The gas mixture in this case leaves the high-temperature stage at a temperature that corresponds to the operating temperature of the high-temperature stage catalyst, and for this reason it must be cooled to the operating temperature of the low-temperature stage catalyst before contact with it.

The temperature of the reformate gas, which derives from the reforming process, corresponds roughly to the operating temperature of the relevant shift stages at medium and high motor vehicle power requirements. However, problems arise in cold starting the vehicle and in the lower load range. In a cold start, the shift catalysts that are used require a certain time to warm up to their operating temperatures. The method in accordance with the invention shortens this warming phase of the catalysts through the addition of oxygen to the reformate gas and partial combustion of the hydrogen contained in the reformate gas, or through oxidation of the carbon monoxide and other oxidizable components of the reformate gas. Besides shortening the warmup phase, the method also allows maintenance of the operating temperature in the lower load range of the motor vehicle.

For use in the method in accordance with the invention, the catalyst can be pressed into tablets or pellets or can be in the form of granulate. It is then used in the form of a bed. However, the poor accessibility of the reactants to the catalytically active centers within the molded articles reduces the specific conversion rate for carbon monoxide and thus the achievable space-time yield. This has corresponding negative effects on the volume of the reactor that is required. In addition, vibrations caused by the operation of the motor vehicle lead to an undesired abrasion of the molded articles, which plugs the flow paths in the bed and thus continuously increases the pressure differential in the reactor.

For this reason, the catalyst is preferably applied to an inert carrier element in the form of a coating. Such a catalyst is called a coating catalyst herein. The monolithic honeycomb elements of ceramic or metal with cell densities (number of flow channels per cross-sectional area) of more than 10 cm$^{-2}$ that are known from automobile exhaust gas treatment are suitable as carrier elements. However, metal sheet, heat exchanger plates, open cell ceramic or metallic foamed elements and elements that are molded in irregular shape, in each case according to requirements can be used as carrier elements. The thickness of the coating can vary between 10 and 100 µm, in each case according to use.

A carrier element within the scope of this invention is characterized as inert if the material of the carrier element does not participate in the catalytic conversion or participates only negligibly. As a rule, these are carriers with specific surface and low porosity.

There are various possibilities for production of a coating catalyst suitable for the method, a few of which are discussed here.

To produce an oxidation-active noble metal shift catalyst on a carrier element in accordance with the invention, the support material for the catalytically active components can be suspended in an aqueous solution of soluble compounds of noble metals selected from the group platinum, palladium, rhodium, ruthenium, iridium, osmium and gold and other soluble compounds of non-noble metals of the subgroups. Then the acid suspension is neutralized at elevated temperature with a base, for example, sodium carbonate, and then reduced at the same temperature with an aqueous reducing agent (formaldehyde, hydrazine), filtered, washed, dried, calcined in an oxidizing atmosphere at a temperature between 300 and 550° C., and then reduced at temperatures between 300 and 600° C. The catalyst material is again suspended in water to produce a coating suspension. The carrier is coated with this suspension. For this, the methods for coating carriers that are known from auto exhaust catalysis can be used. To finish the production of the coating catalyst, the coating is dried, calcined at temperatures between 300 and 600° C. and reduced in a hydrogen-containing gas at temperatures between 300 and 600° C.

As an alternative to the described method, the carrier is first coated only with the support material, where the support material can contain rare earth oxides and oxides of non-noble metals of the subgroups. The coating on the carrier is then impregnated with a solution of at least one soluble noble metal compound, soluble compounds of the rare earths and the non-noble metals of the subgroups. To finish the production of the coating catalyst, the coated carrier is dried, calcined at temperatures between 300 and 600° C. and reduced in a hydrogen-containing gas at temperatures between 300 and 600° C.

Another variation for making a coating catalyst in accordance with the invention consists of first producing a suspension of the support material, the soluble compounds of the noble metals and, optionally, the soluble compounds of the non-noble metals of the subgroups and the rare earths. The dissolved components of the suspension are then precipitated onto the suspended support material through the addition of a basic precipitation agent such as sodium hydroxide. The suspension prepared in this way is used directly for coating the carrier. To finish the production of the coating catalyst, the coated carrier is dried, calcined at temperatures between 300 and 600° C. and reduced in a hydrogen-containing gas at temperatures between 300 and 600° C.

The invention is illustrated in more detail by means of the following examples.

EXAMPLE 1

An oxidation-active noble metal shift catalyst (catalyst A) was produced as follows:

A honeycomb ceramic carrier with 93 cells per square centimeter and a volume of 0.041 L was coated with 7.25 g γ-aluminum oxide as the support material by immersing it in an aqueous suspension of γ-aluminum oxide (specific surface 140 m$^2$/g) and calcining for 2 h at 600° C. After calcination, the coated honeycomb carrier was impregnated with a solution of Ce(NO$_3$)$_2$.6H$_2$O in water and then calcined for 2 h at 500° C. The calcined molded carrier element was then impregnated with a solution of Pt(NO$_3$)$_2$, Pd(NO$_3$)$_2$ and Fe(NO$_3$)$_3$.

The catalytically active coating of the catalyst prepared in this way had a total weight of 5.16 g, which corresponds to 126 g per liter of volume of the honeycomb carrier. It contained 1.2 wt % Pt, 1.2 wt % pd, 2.4 wt % Fe, 35.7 wt % Fe, 35.7 wt % $CeO_2$ and 59.5 wt % $Al_2O_3$.

The catalyst was tested under the conditions of a high temperature conversion with a synthetic reformate. Its $CO_2$ selectivity $S_{CO2}$, CO conversion as well as specific conversion rate $R_{CO}$ in accordance with equation (4) were measured. The following gas composition was used for the high temperature conversion: 27.0 vol % $H_2$, 9.0 vol % CO, 9.0 vol % $CO_2$, 18.0 vol % $H_2O$, 37.0 vol % $N_2$. The catalysts were tested at a gas space velocity GHSV=10,000 $h^{-1}$ and a pressure of 2 bar (absolute).

The $CO_2$ selectivity $S_{CO2}$ of the conversion of carbon monoxide was calculated by means of the partial pressures of the carbon dioxide $P_{CO2}$ and methane $P_{CH4}$ that formed, as $$S_{co_2} = \frac{P_{CO_2}}{P_{CO_2} + P_{CH_4}} \quad (5)$$

TABLE 1

High-Temperature CO conversion on catalyst A

| T [° C.] | $S_{CO_2}$ [%] | CO Conversion [%] | $R_{co}\left[\frac{mol}{g_{cat} \cdot S}\right]$ |
| --- | --- | --- | --- |
| 300 | 100 | 27 | $3.0 \cdot 10^{-5}$ |
| 350 | 100 | 35 | $4.0 \cdot 10^{-5}$ |
| 400 | 100 | 45 | $4.8 \cdot 10^{-5}$ |

Comparison Example 1

A commercial Fe/Cr catalyst (catalyst B; tablets 5×5 mm) was tested under the same conditions as catalyst A.

TABLE 2

High-Temperature CO conversion on catalyst B

| T [° C.] | $S_{CO_2}$ [%] | CO Conversion [%] | $R_{co}\left[\frac{mol}{g_{cat} \cdot S}\right]$ |
| --- | --- | --- | --- |
| 300 | 100 | 30 | $2.2 \cdot 10^{-6}$ |
| 350 | 100 | 37 | $2.7 \cdot 10^{-6}$ |
| 400 | 100 | 45 | $3.3 \cdot 10^{-6}$ |

As Tables 1 and 2 show, both catalysts exhibit comparable CO conversions. However, catalyst A in accordance with the invention shows a tenfold higher specific conversion rate $R_{CO}$ in comparison with catalyst B, because of its higher activity.

Further modifications and revisions of the foregoing will be apparent to those skilled in the art and are intended to be encompassed by the claims appended hereto.

German application 100 13 894.2 is relied on and incorporated herein by reference.

We claim:

1. A method for catalytic conversion of carbon monoxide with water to form carbon dioxide and hydrogen in a gas mixture that contains hydrogen and other oxidizable components comprising passing the gas mixture over a shift catalyst that is at an operating temperature for carbon monoxide conversion, wherein the shift catalyst comprises at least one of the noble metals selected from the group consisting of platinum, palladium, rhodium, ruthenium, iridium, osmium and gold on an oxide support material selected from the group consisting of aluminum oxide, silicon dioxide, titanium dioxide, rare earth oxides, mixed oxides thereof and zeolites and wherein oxygen is added to the gas mixture in order to bring the catalyst to its operating temperature for carbon monoxide conversion rapidly after a cold start, or to keep it at said temperature during operation, by catalytic combustion of a variable proportion of the oxidizable components of the gas mixture.

2. The method according to claim 1, wherein the shift catalyst contains at least one rare earth metal as an additional catalytically active component.

3. The method according to claim 1, wherein the shift catalyst contains at least one non-noble metal of the subgroups of the periodic system of elements as an additional catalytically active component.

4. The method according to claim 3, wherein the oxide support material is doped with a redox-active oxide of a metal selected from the group consisting of cerium, zirconium, titanium, vanadium, manganese and iron in an amount of 1 to 50 wt % with respect to the total weight of the support material.

5. The method according to claim 4, wherein the noble metal shift catalyst contains platinum and/or palladium together with iron or copper as well as cerium oxide on a finely divided aluminum oxide.

6. The method according to claim 1, wherein an operating temperature of the catalyst is established by partial oxidation of the gas mixture, and said gas mixture comprises oxygen that is used in said partial oxidation.

7. The method according to claim 1, wherein the gas mixture is passed over the catalyst at a space velocity between an idling space velocity and 100,000 $h^{31\ 1}$ and at a pressure between atmospheric pressure and 10 bar.

8. The method according to claim 7, wherein the operating temperature of the oxidation-active noble metal shift catalyst lies between 180 and 300° C.

9. The method according to claim 8, wherein the gas mixture contains 2 to 15 vol % carbon monoxide.

10. The method according to claim 7, wherein the operating temperature of the oxidation-active noble metal shift catalyst lies between 280 and 550° C.

11. The method according to claim 10, wherein an additional oxidation-active noble metal shift catalyst with an operating temperature between 180 and 300° C. is connected to the oxidation-active noble shift catalyst with an operating temperature between 280 and 550° C., and the gas mixture is cooled to the operating temperature of the additional catalyst before contact with it.

12. The method according to claim 10, wherein the gas mixture contains 2 to 40 vol % carbon monoxide.

13. The method according to claim 1, wherein the catalyst is pressed into tablets or pellets.

14. The method according to claim 1, wherein the catalyst is applied to an inert carrier in the form of a coating.

15. The method according to claim 14, wherein monolithic honeycomb elements of ceramic or metal, open cell ceramic or metallic foam elements, metal sheet, heat exchanger plates or irregularly shaped elements are used as inert carriers.

16. The method according to claim 15, wherein the shift catalyst contains platinum and/or palladium together with iron or copper as well as cerium oxide on a finely divided aluminum oxide, where the catalyst is applied in the form of a coating to a monolithic honeycomb carrier of ceramic or metal.

* * * * *